Dec. 2, 1969

K. P. HURLIN 3,482,135

BRUSH ASSEMBLY

Filed Oct. 30, 1967

KENNETH P. HURLIN
INVENTOR.

BY John R. Faulkner
William F. Johnson

ATTORNEYS

Dec. 2, 1969   K. P. HURLIN   3,482,135
BRUSH ASSEMBLY

Filed Oct. 30, 1967   2 Sheets-Sheet 2

KENNETH P. HURLIN
INVENTOR.

BY *John L. Faulkner*
*William E. Johnson*
ATTORNEYS

United States Patent Office 3,482,135
Patented Dec. 2, 1969

3,482,135
BRUSH ASSEMBLY
Kenneth P. Hurlin, Farmington, Mich., assignor to Ford Motor Company, Dearborn, Mich., a corporation of Delaware
Filed Oct. 30, 1967, Ser. No. 678,895
Int. Cl. H01r *39/38*
U.S. Cl. 310—239                                             3 Claims

ABSTRACT OF THE DISCLOSURE

A brush assembly for a rotating electrical device having commutator segments utilizes a one-piece brush holder element. The element has a portion forming a terminal to which an electrical connector may be secured. Another elongated, flexible portion of the element provides spring action and a further portion at the end of the elongated portion supports a brush in contact with the commutator segments. The brush is biased into engagement with the commutator segments by the spring action of the elongated portion.

BACKGROUND OF THE INVENTION

Present brush assemblies of a rotating electrical device generally utilize a brush and an assembly for mounting the brush in juxtaposition to the commutator segments of the device. A portion of the brush mounting assembly generally is formed by a brush box surrounding the brush and a brush spring within the brush box for applying a biasing force to the brush to keep the same in engagement with the commutator segments. A lead is also soldered or otherwise connected to the brush so that the brush may be connected to an outside electrical circuit.

The brush assembly of this invention reduces the number of parts necessary to construct a brush assembly thereby reducing the number of electrical junction points in the assembly as well as reducing the time required to form the assembly. The assembly of this invention is, therefore, more reliable in operation since there is a reduction in the number of electrical junction points at which the assembly may fail.

SUMMARY OF THE INVENTION

This invention is directed to a brush assembly and, more particularly, the invention is directed to the construction of a brush assembly which reduces both the number of parts and the number of electrical junction points heretofore employed in such an assembly.

The brush assembly of this invention is formed for mounting a brush in engagement with commutator segments of a rotating electrical device supported by supporting structure for rotation about an axis. The assembly is constructed in the following manner. A nonconductive member is secured to the supporting structure near the commutator segments of the rotating electrical device. A one-piece brush holder element, formed of conductive material, is secured to the nonconductive member. The brush holder element also has an elongated portion extending from its area of securement to the nonconductive member generally toward the commutator segments of the device. The elongated portion terminates in a brush holder portion. The element also provides a terminus for an electrical lead. A brush of electrically conductive material is secured to the holder portion of the brush holder element and extends into engagement with the commutator segments of the rotating electrical device to complete an electrical circuit from the segments to the terminus for the electrical lead. The brush holder element is secured to the nonconductive member to locate the elongated portion thereof in such a position with respect to the commutator segments that the force applied to the brush by successive engagements thereof by the rotating commutator segments does not cause any compressive stress in the elongated portion. The elongated portion of the element is flexible and provides a spring action on the holder portion which biases the brush into engagement with the commutator segments.

DESCRIPTION OF THE PREFERRED EMBODIMENT

Figure 1:
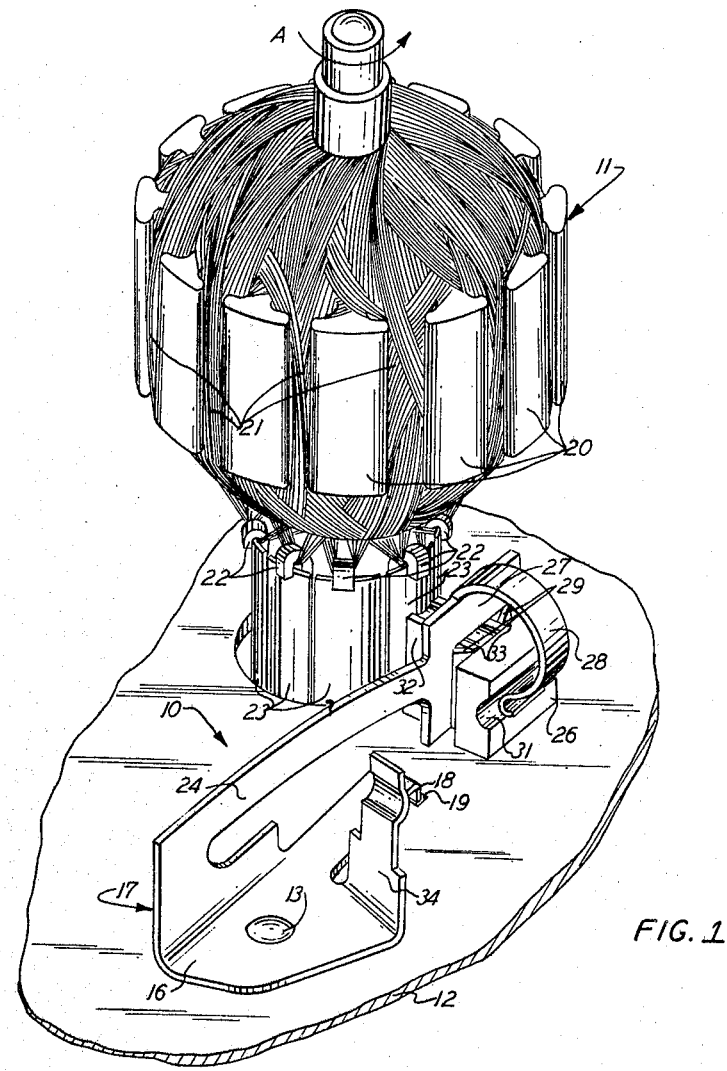
FIGURE 1 is an isometric view showing the brush assembly of this invention in an operative position with respect to the commutator segments of a rotating electrical device such as a motor.

In FIGURE 1 there is shown the brush assembly of this invention, generally designated by the numeral 10. The brush assembly shown in the preferred embodiment is utilized in conjunction with an armature, generally desigated by the numeral 11, of a rotating electrical device such as a motor.

A one-piece brush holder element 17 of the brush assembly 10 is secured to a nonconductive mounting board 12 by means of a rivet 13 which passes through an opening 14 in an attaching portion 16 of the element. The attaching portion 16 of the element 17 also has a hook end 18 formed thereon which is received in an opening 19 in the mounting board 12. The positioning of the hook end 18 in the opening 19, and the securement of the brush holder element 17 to the board 12 by the rivet 13 provides a rapid way of precisely locating the brush element with respect to the armature 11.

In the preferred embodiment, the armature 11 is mounted for rotational movement in a counter-clockwise direction as in the direction of arrow A of FIGURE 1. The mounting board 12 may be secured to the housing which encloses the armature 11, which housing may also support the necessary field next to the poles 20 of the armature. Windings 21 of the armature are associated with a plurality of terminal 22, each terminal being electrically connected to an associated one of a plurality of commutator segments 23.

The brush holder element 17 is formed, as by a stamping operation, from any suitable electrically conductive material, such as beryllium copper. In its preferred embodiment, the element 17 has an elongated portion 24 extending initially upwardly from and then generally along the length of the attaching portion 16. The width and the length of the elongated portion 24 of the element 17 are controlled so that this portion is flexible and provides a predetermined biasing force to a brush 26 held in a brush holder portion 27 of the element 17. The brush is held in engagement with the commutator segments 23 of the armature 11 to establish the electric circuit path to the armature.

Figure 2:
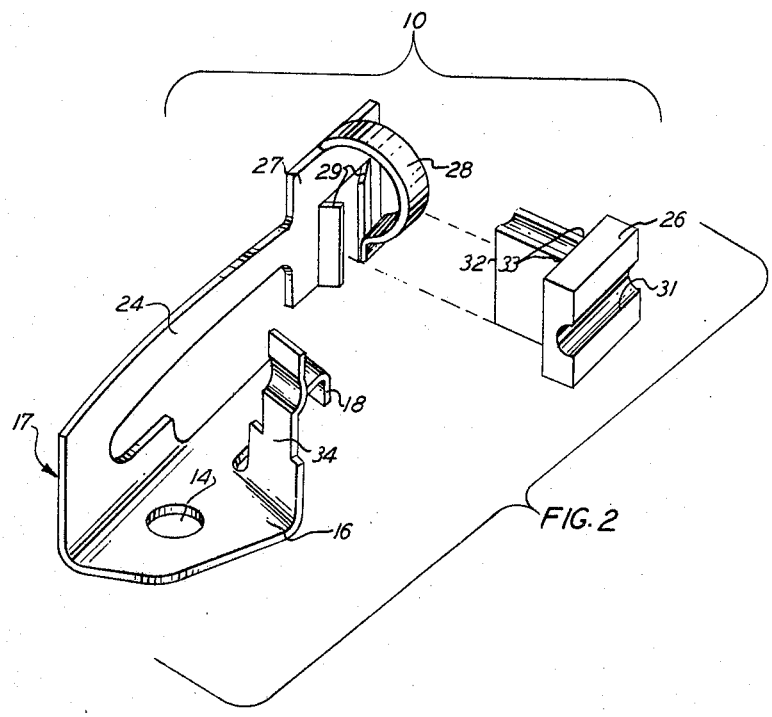
FIGURE 2 is an isometric view of the brush assembly of this invention in a disassembled condition showing the various details of the assembly.

As is best seen in FIGURE 2, the brush holder portion 27 of the brush holder element 17 is formed on the end of the spring portion 24 of the element. In its preferred form, the brush holder portion 27 has a pigtail spring element 28 and two extending elements 29 projecting outwardly from the surface of the holder portion 27.

As is best illustrated in FIGURE 1, the pigtail spring element 28 enters a recess 31 of the brush 26 so as to bring a front face 32 of the brush into engagement with the commutator segments 23 of the armature 11. The extending elements 29 of the brush holder portion 27 are forced into engagement with respective corners 33 of the brush 26 and make scraping contact therewith to insure good electrical interconnection therebetween. The brush 26 may be made of a graphite material containing approximately 10% copper. Also, the brush 26 may be attached to a solid brush holder portion by a brazing operation.

In the preferred form of the brush holder element 17 of this invention, there is formed integrally with the other portions of the element a terminal portion 34 thereof. The terminal portion 34 is formed integrally with the attaching portion 16 of the element 17 and extends upwardly therefrom in a direction generally perpendicular to the surface of the mounting board 12. The terminal portion extends above the board to a height sufficient to allow a suitable clip terminal to be attached to the free end thereof whereby one lead of an electrical circuit may be completed to the armature 11. An electrical circuit path is formed through the terminal portion 34, the attaching portion 16, the spring portion 24, the holder portion 27 of the element 17, the brush 26 and then the commutator segments 23 of the armature 11. It is, of course, understood that a second brush assembly, similar to the one described, is also provided for use in association with the armature 11 whereby the power and ground sides of the circuit may be completed through the armature. In this preferred embodiment, the brush holder is mounted on a nonconductive board 12 because the brush is a positive brush. The brush could be mounted on a conductor for a direct path to ground in the case of an internally grounded, negative brush.

As previously mentioned, the spring portion 24 of the brush holder element 17 has the width and length thereof controlled in accordance with the specific application to which the electrical device is put. More particularly, the rotational speed at which the armature 11 will operate will set up a certain vibrational rate in the brush 26. The width and length of the elongated portion 24 and the relative angle of location of the portion 24 with respect to the commutator segments may be varied such that the vibration set up in the brush will not be fundamental to, or a multiple of, the natural harmonic vibration of the elongated portion in a selected brush holder assembly construction.

The holder element 17 is so attached to the mounting board 12 that the holder portion 27 thereof brings the front face 32 of the brush 26 into engagement with the commutator segments 23 in such a manner that any force imparted by the commutator segments on the brush does not cause compressive stress in the elongated portion 24 of the element. More particularly, if compressive stresses were allowed in the elongated portion, this portion would tend to bow and would not bias the brush continuously against the rotating commutator segments moving therepast. Thus, by proper location of the openings in the board 12 which receive the rivet 13 and the hook end 18, the brush assembly 10 is precisely located so that the brush thereof is biased into engagement with the rotating commutator segments of the armature in such a manner that a continuous electrical interconnection is formed therebetween.

There has been disclosed herein a one-piece brush assembly in which a single piece of conductive material forms the holder for the brush, the means for biasing the brush element into engagement with the commutator segments of a rotating electrical device, the means for attaching the brush assembly to the supporting structure, and the terminal through which an electrical connection may be made to the brush. The entire unit may be formed out of a single piece of metal. The assembly is relatively inexpensive to produce and is advantageous from the standpoint that it eliminates many parts and the electrical junctions therebetween which were necessary in forming brush assemblies in accordance with the teachings of the prior art.

In view of the teachings of this specification, modifications of this invention will be apparent to those skilled in the art. It is intended that all modifications which fall within the true spirit and scope of this invention be included within the scope of the appended claims.

What is claimed is:

1. A brush assembly for an electrical device having commutator segments, the device being supported by supporting structure for rotation about an axis, the assembly comprising:

a member secured to the supporting structure;

a one-piece brush holder element formed of a conductive material and secured to said member, said brush holder element having an elongated portion extending from its area of securement to said member generally toward the commutator segments of the device, said elongated portion terminating in a holder portion, said element also providing a terminus for an electrical lead;

a brush of electrically conductive material secured to said holder portion and extending into engagement with the commutator segments of the device to complete an electrical circuit from the segments to said terminus for the electrical lead;

said brush holder element being secured to said member to locate said elongated portion in such a position with respect to the commutator segments that force applied to said brush by successive engagements thereof by the rotating commutator segments does not cause any compressive stress in said elongated portion, said elongated portion being flexible and providing a spring action on said holder portion which biases said brush into engagement with the commutator segments.

2. A brush assembly for an electrical device having commutator segments, the device being supported by supporting structure for rotation about an axis, the assembly comprising:

a board secured to the supporting structure and extending generally toward the commutator segments of the device;

a one-piece brush holder element formed of a conductive material and having;

an attaching portion secured to said board;

an elongated portion extending from said attaching portion to a position adjacent the commutator segments of the device, the elongation of said portion providing a flexing, spring action therefor;

a brush holder portion extending from the end of said elongated portion, said holder portion having means thereon for securing a brush thereto, and a terminal portion extending from said attaching portion; and a brush of electrically conductive material secured by said holder means to said holder portion of said element, the face of said brush being biased into engagement with the commutator segments of the device by the spring action of said elongated portion of said element to complete an electrical circuit from the device to said terminal portion of said element through said attaching portion, said elongated portion, said holder portion and said brush;

said brush holder element being secured to said board to locate said elongated portion in such a position with respect to the commutator segments that force applied to said brush by successive engagements thereof by the rotating commutator segments does not cause any compressive stress in said elongated portion.

3. A brush assembly for an electrical device having commutator segments, the device being supported by supporting structure for rotation about an axis, the assembly comprising:
- a nonconductive board secured to the supporting structure and extending generally toward the commutator segments of the device, said board having at least two spaced openings therein;
- a one-piece brush holder element formed of a conductive material and having;
    - an attaching portion with an opening therethrough and a hook end thereon, said hook end being received in one of said openings of said board when said opening of said attaching portion overlies the other of said openings of said board;
    - an elongated portion extending from said attaching portion of said element toward the device to a terminal position adjacent the commutator segments of the device, the elongation of said portion providing a flexing, spring action therefor;
    - a brush holder portion extending from the end of said elongated portion adjacent the device, said holder portion having a pigtail element and two projecting elements formed thereon which extend generally away from the commutator segments of the electrical device, and
    - a terminal portion upstanding from said attaching portion, said terminal portion having the free end thereof formed so that an electrical lead is attachable thereto;
- a T shaped brush of electrically conductive material having a recess across the length of its cross member cooperative with said pigtail element of said holder portion to maintain said brush in said holder portion with said two projecting elements engaging corners of said brush to make electrical contact therewith, the front face of said brush extending into engagement into engagement with the commutator segments of the device to complete an electrical circuit path from the device to said terminal portion of said element through said attaching portion, said elongated portion, said holder portion and said brush; and
- a rivet passing through the aligned openings in said board and said attaching portion of said element to secure said one-piece brush holder element to said nonconductive board to locate said elongated portion of said element in such a position with respect to the commutator segments that force applied to said brush by successive engagements thereof by the rotating commutator segments does not cause any compressive stress in said elongated portion.

References Cited
UNITED STATES PATENTS

| | | | |
|---|---|---|---|
| 340,395 | 4/1886 | Weston | 310—239 |
| 1,536,329 | 5/1925 | Caruso | 310—239 |
| 2,463,097 | 3/1949 | Gayer | 310—239 |
| 3,162,782 | 12/1964 | Downs | 310—239 |
| 3,296,473 | 1/1967 | Mabuch | 310—239 |

MILTON O. HIRSHFIELD, Primary Examiner

R. SKUDY, Assistant Examiner